(12) United States Patent
Ha et al.

(10) Patent No.: US 8,475,334 B2
(45) Date of Patent: Jul. 2, 2013

(54) LOAD-SENSITIVE AUTOMATIC TRANSMISSION SYSTEM FOR AGRICULTURAL ELECTRIC VEHICLE

(75) Inventors: Chang Wook Ha, Changnyeong-gun (KR); Byoung Soo Kwon, Changnyeong-gun (KR); Sung Do Im, Changnyeong-gun (KR)

(73) Assignees: Daedong Industrial Co., Ltd., Daegu (KR); Hankuk Chain Industrial Co., Ltd, Anseong-si (KR)

( * ) Notice: Subject to any disclaimer, the term of this patent is extended or adjusted under 35 U.S.C. 154(b) by 224 days.

(21) Appl. No.: 13/177,670

(22) Filed: Jul. 7, 2011

(65) Prior Publication Data

US 2012/0010042 A1    Jan. 12, 2012

(30) Foreign Application Priority Data

Jul. 8, 2010    (KR) ........................ 10-2010-0065672

(51) Int. Cl.
*H02P 17/00*    (2006.01)
(52) U.S. Cl.
USPC ............................................................ 477/20
(58) Field of Classification Search
USPC .................................................. 477/20, 115
See application file for complete search history.

(56) References Cited

U.S. PATENT DOCUMENTS

| | | | |
|---|---|---|---|
| 6,364,806 B1 * | 4/2002 | Spaniel | 477/3 |
| 6,781,251 B2 * | 8/2004 | Takaoka et al. | 290/40 C |
| 7,731,626 B2 * | 6/2010 | Sauvlet et al. | 477/3 |

FOREIGN PATENT DOCUMENTS

| | | |
|---|---|---|
| JP | 59-175660 A | 10/1984 |
| JP | 1995-063253 A | 3/1995 |

OTHER PUBLICATIONS

Korean Office Action for Korean Patent Application No. 10-2010-0065672 which corresponds to the above-identified application.

* cited by examiner

*Primary Examiner* — Edwin A Young
(74) *Attorney, Agent, or Firm* — LRK Patent Law Firm

(57) ABSTRACT

A load-sensitive automatic transmission system for an agricultural electric vehicle is provided, which includes a drive motor for generating a rotational power using electric power of a battery; a transmission for changing a rotational speed of the drive motor in multiple stages and outputting the changed rotational speed; a forward/reverse differential gear for transmitting the power of the transmission to wheels; a control unit for detecting a running state of the vehicle and a load state of the drive motor and determining a speed change time; and an actuator for operating the transmission in response to a signal from the control unit. Accordingly, it is possible to selectively provide high speed and torque to meet the needs of different situation, beyond the limitations of the motor drive performance of a conventional electric vehicle.

22 Claims, 7 Drawing Sheets

LOAD-SENSITIVE AUTOMATIC TRANSMISSION SYSTEM FOR AGRICULTURAL ELECTRIC VEHICLE

CROSS-REFERENCE TO RELATED APPLICATION

This application claims priority to and the benefit of Korean Patent Application No. 10-2010-0065672, filed on Jul. 8, 2010, the disclosure of which is incorporated herein by reference in its entirety.

BACKGROUND

1. Field of the Invention

The present invention relates to an agricultural electric vehicle and, more particularly, to a load-sensitive automatic transmission system for an agricultural electric vehicle, which can automatically perform the speed change by detecting a motor load of an electric vehicle powered by a motor.

2. Discussion of Related Art

Generally, an electric vehicle is powered by electricity, which produces no emissions, compared to conventional vehicles using gasoline or natural gas, and has a structure shown in FIG. 7.

FIG. 7 is a schematic diagram illustrating the structure of a conventional electric vehicle, which generally comprises a battery 10, a motor 20 for generating a driving force using the electric power of the battery 10, a differential gear 50 for transmitting the driving force of the motor 20 to wheels 51, and a control unit 60 including a power control unit (PCU) and a power relay assembly (PRA) for controlling the current supplied to the motor 20.

Since the rotational direction (forward or reverse rotation) and rotational speed of the motor 20 in the above-described motor-driven vehicle are controlled by a current signal, the motor 20 has advantages that the forward/reverse movement and the speed control are convenient.

Especially, in the motor-driven vehicle, the use of a forward/reverse gear employed in an engine-driven vehicle, a clutch mechanism for cutting off the power in an idle state, etc., is not required, and thus it is possible to reduce the weight of the vehicle and the manufacturing cost.

However, the above-described electric vehicle is difficult to achieve a high torque due to the nature of the motor, and thus cannot be used as a working vehicle for agriculture or construction.

Due to these features, the use of the electric vehicle has been limited to driving on city streets.

SUMMARY OF THE INVENTION

The prevent invention has been made in an effort to solve the above-described problems associated with the prior art, and an object of the present invention is to provide a load-sensitive automatic transmission system for an agricultural electric vehicle driven by the power of a motor, in which a transmission for changing the rotational speed of the drive motor in multiple stages is provided to provide low RPM and high torque using a small motor. Moreover, according to the load-sensitive automatic transmission system of the present invention, the load of the motor is automatically detected during hill climbing to automatically shift the transmission to a low-speed stage, thus improving the high climbing performance and, at the same time, preventing a transmission shock or any unexpected accidents due to backward rolling of the vehicle caused by manual transmission operation on a slope.

According to an aspect of the present invention for achieving the above objects, there is provided a load-sensitive automatic transmission system for an agricultural electric vehicle, the automatic transmission system comprising: a drive motor for generating a rotational power using electric power of a battery; a transmission for changing a rotational speed of the drive motor in multiple stages and outputting the changed rotational speed; a forward/reverse differential gear for transmitting the power of the transmission to wheels; a control unit for detecting a running state of the vehicle and a load state of the drive motor and determining a speed change time; and an actuator for operating the transmission in response to a signal from the control unit.

The control unit may comprise a vehicle speed sensor for detecting a running speed of the vehicle.

The transmission and the forward/reverse differential gear may be integrally formed with each other.

The actuator may be an electronic clutch or a hydraulic system.

The transmission may be classified into a double-acting transmission including a plurality of hydraulic lines and a single-acting transmission including a single hydraulic line according to a control method of the hydraulic system, and any one of the two types of transmissions may be selectively used.

The double-action transmission may comprise a mission input shaft connected to a shaft of the motor to receive the rotational force of the motor, a power transmission shaft transmitting the power of the mission input shaft to an axle and arranged in parallel to the mission input shaft, and a high-speed gear and a low-speed gear spaced from each other in the axial direction, provided on the mission input shaft and the power transmission shaft, respectively, and engaged with the mission input shaft and the power transmission shaft to transmit power, and the high-speed gear and the low-speed gear provided on the mission input shaft may be axially connected thereto so as to operate in an idle state, and a multi-plate clutch, which is configured to rotate together with the mission input shaft and be selectively connected to either the high-speed gear or the low-speed gear, may be provided on the outer circumference in the middle of the mission input shaft.

The double-acting transmission may further comprise a double-acting flow path for supplying a working fluid to pistons on both sides of the mission input shaft, respectively, the double-acting flow path being provided in the middle of the mission input shaft.

The single-acting transmission may comprise a mission input shaft connected to a shaft of the motor to receive the rotational force of the motor, a power transmission shall transmitting the power of the mission input shaft to an axle and arranged in parallel to the mission input shaft, and a high-speed gear and a low-speed gear spaced from each other in the axial direction, provided on the mission input shaft and the power transmission shaft, respectively, and engaged with the mission input shaft and the power transmission shaft to transmit power, and the high-speed gear and the low-speed gear provided on the power transmission shaft may be axially connected thereto so as to operate in an idle state, and a multi-plate clutch, which is configured to rotate together with the power transmission shaft and be selectively connected to either the high-speed gear or the low-speed gear, may be provided on the outer circumference in the middle of the power transmission shaft.

The multi-plate clutch may comprise a piston hydraulically operated in one direction of a main body and elastically supported by a return spring in the other direction of the main body, a plurality of clutch plates and a plurality of clutch discs, which are alternately provided in the direction that the piston is hydraulically operated such that the piston operates to press the clutch plates to the clutch discs, thus enabling power transmission by frictional force.

The single-acting transmission may further comprise a single-acting flow path for supplying a working fluid to the piston, the single-acting flow path being formed around the power transmission shaft.

The multi-plate clutch may further comprise an internal gear formed on the inner circumference of the piston to be engaged with the outer circumference of the high-speed gear such that the internal gear is engaged with the high-speed gear when the piston is pulled back by the return spring, thus enabling power transmission.

According to another aspect of the present invention for achieving the above objects, there is provided a load-sensitive automatic transmission system for an agricultural electric vehicle, the automatic transmission system being configured to determine whether a motor is in a high-load state based on the amount of current detected, before increasing the output power of the motor, if an acceleration means, which is configured to control the vehicle based on a driver's intent, is in an acceleration state, to determine whether a transmission is at a high-speed stage or low-speed stage if the motor is in the high-load state, to determine whether a running speed of the vehicle is higher than a predetermined reference value if the transmission is at the high-speed stage, and to transmit a signal to an actuator to automatically shift the transmission to the low-speed stage if the running speed is lower than the reference value.

The acceleration means may be an accelerator pedal such that an angle of the accelerator pedal is detected and, if the angle of the accelerator pedal is in an increasing state, it is determined that the acceleration means is in an acceleration state.

The load of the motor may be measured based on the amount of current flowing in the motor and, if the current value exceeds a predetermined reference value, it may be determined that the motor is in the high-load state, thus performing the speed change.

The reference value may exceed 40% of a maximum output current.

The actuator may be an electronic clutch or a hydraulic system.

According to still another aspect of the present invention for achieving the above objects, there is provided a method for controlling a load-sensitive automatic transmission system for an agricultural electric vehicle, the method comprising the steps of: starting the vehicle; determining whether an acceleration means is in an acceleration state; determining whether a motor is in a high-load state if the acceleration means is in the acceleration state; determining whether a transmission is at a high-speed stage or low-speed stage if the motor is in the high-load state; determining whether a running speed of the vehicle is higher than a predetermined reference value if the transmission is at the high-speed stage; and automatically shifting the transmission to the low-speed stage if the running speed is lower than the reference value.

The method may further comprise the step of automatically shifting the transmission to the high-speed stage if the running speed is higher than the reference value while the transmission is at the low-speed stage and the step of performing a cooling process on the motor if the running speed is lower than the reference value.

The method may further comprise the step of performing a cooling process on the motor if the running speed is higher than the reference value while the transmission is at the high-speed stage.

The running speed may be represented by the following formula:

$$\text{Motor rotational speed(RPM)} \times \text{Speed change ratio}.$$

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, exemplary embodiments of the present invention will be described in detail below with reference to the accompanying drawings such that those skilled in the art to which the present invention pertains can easily practice the present invention.

Figure 1:
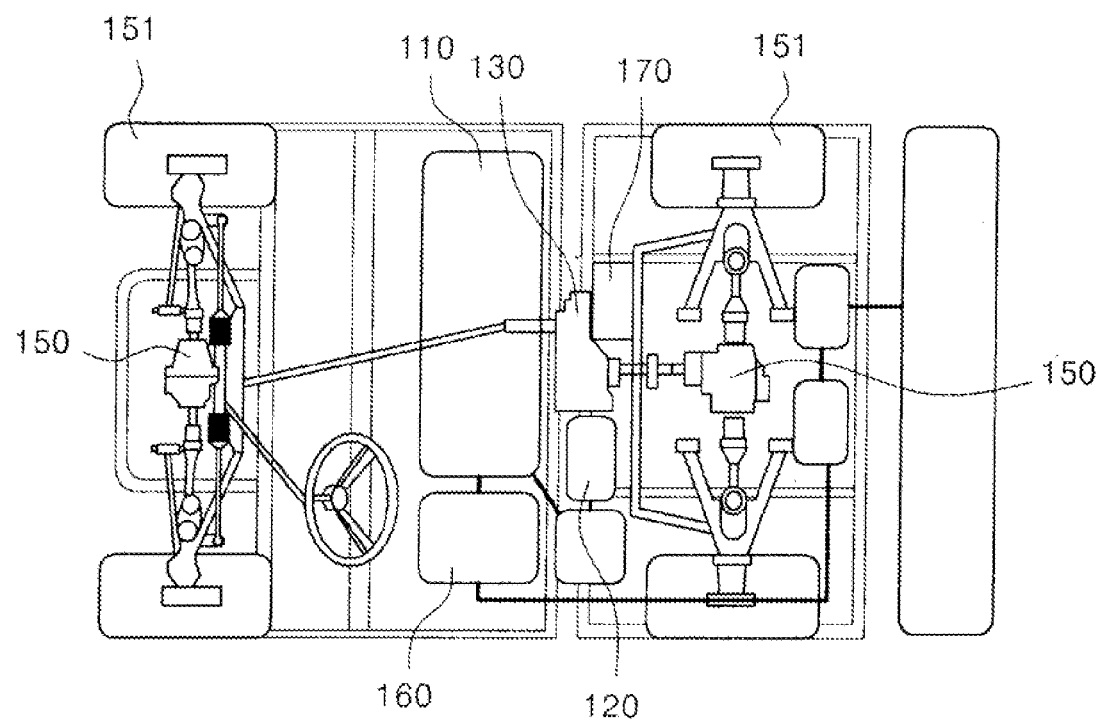
FIG. 1 is a schematic diagram illustrating the structure of an agricultural electric vehicle according to the present invention.

FIG. 1 is a schematic diagram illustrating the structure of an agricultural electric vehicle according to the present invention.

As shown in the figure, the agricultural electric vehicle according to the present invention comprises a drive motor 120 for generating a rotational power using electric power of a battery 110, a transmission 130 for changing the rotational speed of the drive motor 120 in multiple stages and outputting the changed rotational speed, a forward/reverse differential gear 150 for transmitting the power of the transmission 130 to wheels 51, a control unit 160 for detecting a running state of the vehicle and a load state of the drive motor 120 and determining a speed change time, and an actuator 170 for operating the transmission 130 in response to a signal from the control unit 160.

Here, the transmission 130 and the forward/reverse differential gear 150 may be integrally formed with each other.

The drive motor 120 is used to drive the agricultural electric vehicle.

The control unit 160 may comprise a vehicle speed sensor for detecting the running speed of the vehicle.

Moreover, as the actuator 170, an electronic clutch or a hydraulic system including a hydraulic pump and a hydraulic valve may be used.

Next, the transmission 130 will be described in more detail with reference to the accompanying drawings.

Figure 2:
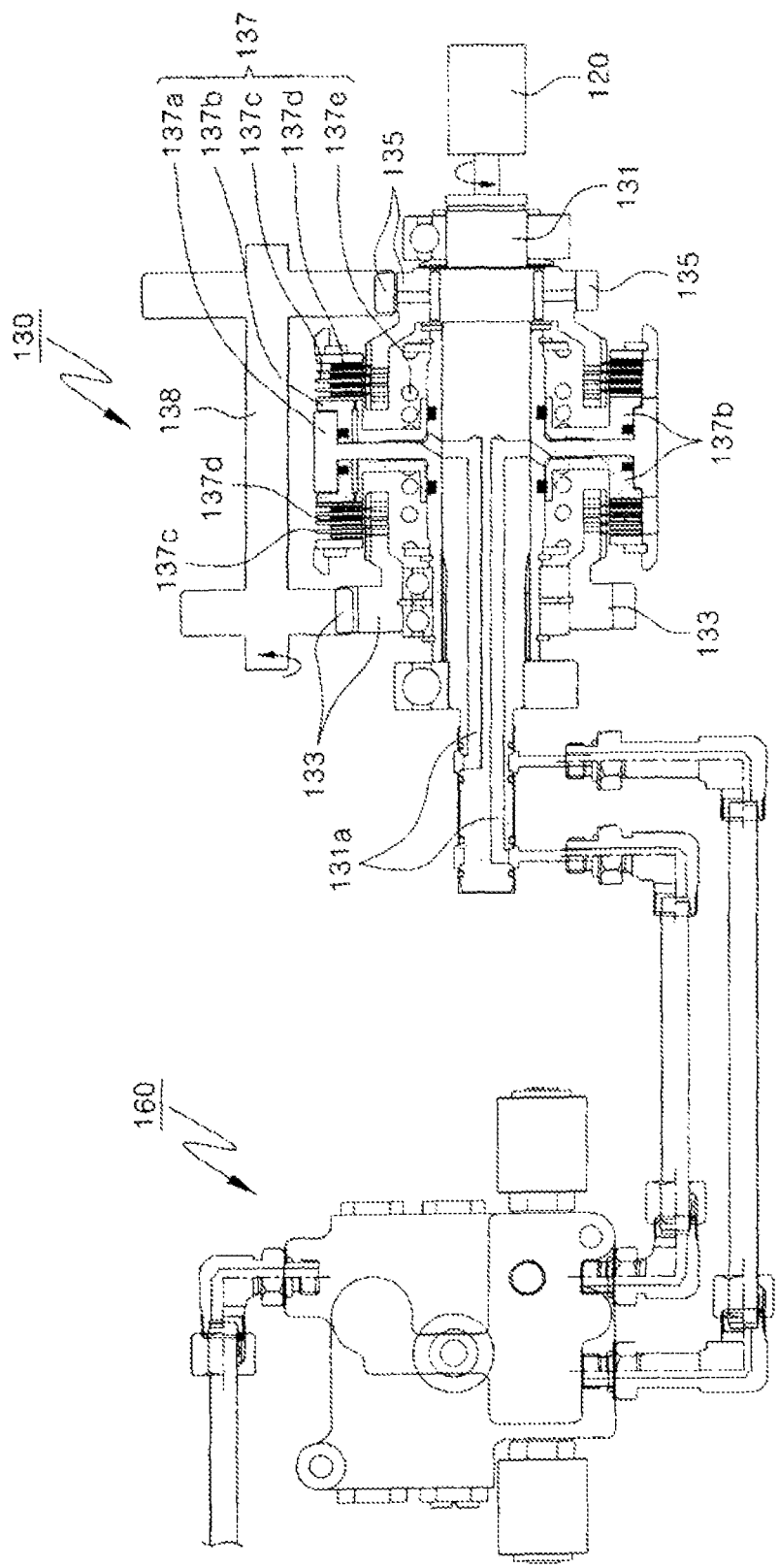
FIG. 2 is a cross-sectional view illustrating a double-acting transmission as a first embodiment of a transmission according to the present invention.
Figure 3:
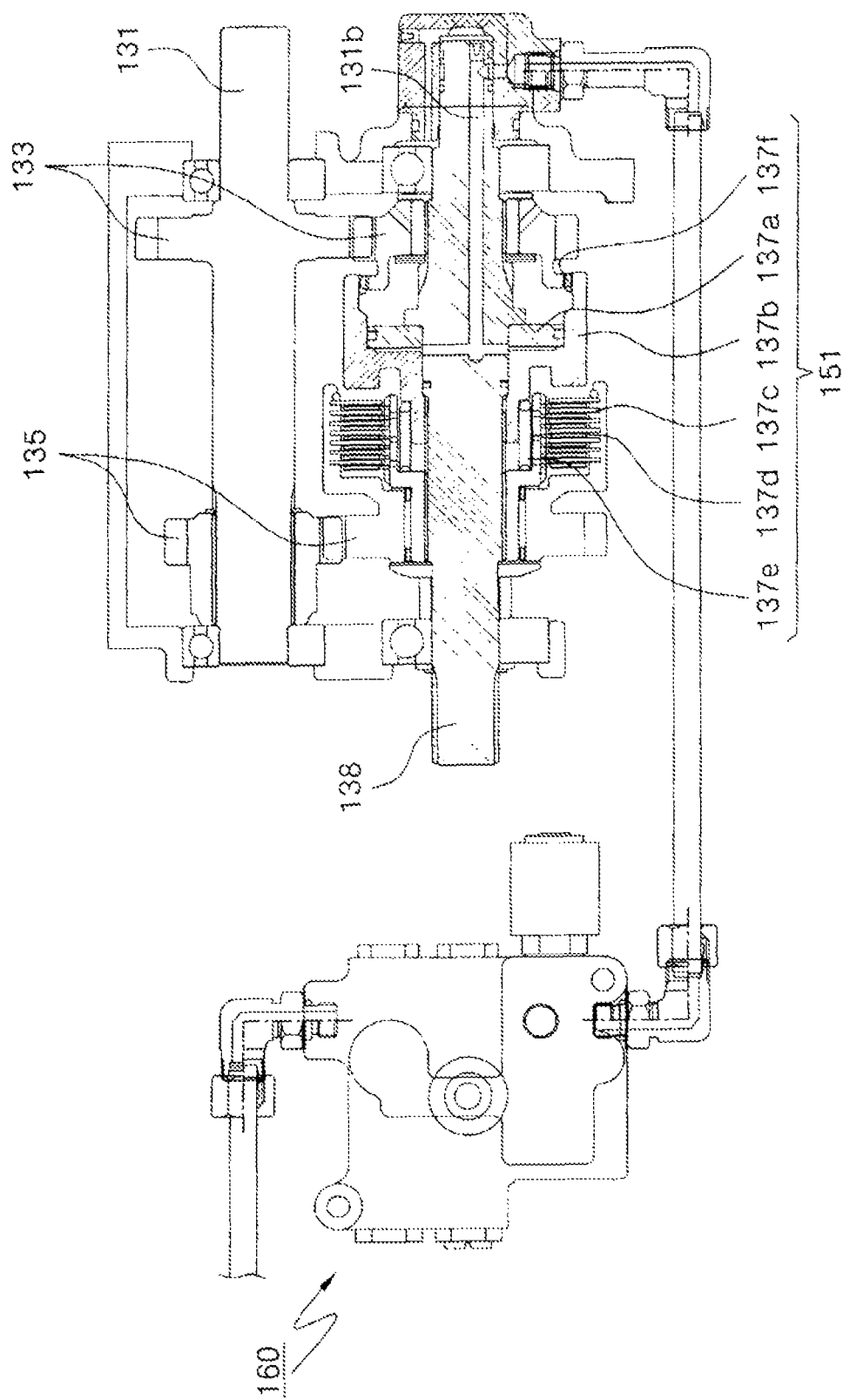
FIG. 3 is a cross-sectional view illustrating a single-acting transmission as a second embodiment of a transmission according to the present invention.

First, FIGS. 2 and 3 show examples in which a hydraulic system is used as the actuator 170 of the present invention, and the transmission 130 can be classified into a double-acting transmission and a single-acting transmission according to the control method of the hydraulic system.

FIG. 2 is a cross-sectional view illustrating a double-acting transmission as a first embodiment of the transmission according to the present invention. As shown in the figure, a double-acting transmission 130 comprises a mission input shaft 131 connected to a shaft of the motor 120 to receive the rotational force of the motor 120 and a power transmission shaft 138 transmitting the power of the mission input shaft 131 to an axle, the power transmission shall 138 being arranged in parallel to the mission input shaft 131.

A high-speed gear 133 and a low-speed gear 135 spaced from each other in the axial direction are provided on the mission input shaft 131 and the power transmission shaft 138, respectively, and engaged with the mission input shaft 131 and the power transmission shall 138 to transmit power.

Here, the high-speed gear 133 and the low-speed gear 135 provided on the mission input shaft 131 are axially connected thereto so as to operate in an idle state.

A multi-plate clutch 137, which is configured to rotate together with the mission input shaft 131 and be selectively connected to either the high-speed gear 133 or the low-speed gear 135, is provided on the outer circumference in the middle of the mission input shaft 131.

The multi-plate clutch 137 comprises a pair of pistons 137b hydraulically operated in both directions of a main body 137a, a plurality of clutch plates 137e, and a plurality of clutch discs 137d. The clutch plates 137c and the clutch discs 137d are alternately provided between the pistons 137b and the high-speed gear 133 and between the pistons 137b and the low-speed gear 135 such that the pistons 137b operate to press the clutch plates 137c to the clutch discs 137d, thus enabling power transmission by frictional force.

Here, the clutch plates 137c are elastically supported by a return spring 137e and, when the hydraulic pressure supply is cut off, the clutch plates 137c are returned to their original state such that the frictional force with the clutch discs 137d is removed, thus cutting off the power transmission.

A double-acting flow path 131a for supplying a working fluid to the pistons 137b on both sides of the mission input shaft 131 is provided, respectively, in the middle of the mission input shaft 131. The actuator 170 selectively supplies the working fluid to the flow paths 131a in response to a signal from the control unit 160 to selectively perform the power transmission to the high-speed gear 133 or the low-speed gear 135.

Here, the high-speed gear 133 and the low-speed gear 135 are simultaneously engaged with the power transmission shaft 138 such that the power transmission shaft 138 rotates at a reduction ratio of the high-speed gear 133 or the low-speed gear 135, which has received the rotational power from the drive motor 120.

FIG. 3 is a cross-sectional view illustrating a single-acting transmission as a second embodiment of the transmission according to the present invention. As shown in the figure, a single-acting transmission 130 comprises a mission input shaft 131 connected to a shaft of the motor 120 to receive the rotational force of the motor 120 and a power transmission shaft 138 transmitting the power of the mission input shaft 131 to an axle, the power transmission shaft 138 being arranged in parallel to the mission input shaft 131.

A high-speed gear 133 and a low-speed gear 135 spaced from each other in the axial direction are provided on the mission input shaft 131 and the power transmission shaft 138, respectively, and engaged with the mission input shaft 131 and the power transmission shaft 138 to transmit power.

Here, the high-speed gear 133 and the low-speed gear 135 provided on the mission input shaft 131 rotate together with the mission input shaft 131, but the high-speed gear 133 and the low-speed gear 135 provided on the power transmission shaft 138 are to operate in an idle state.

A multi-plate clutch 137, which is configured to rotate together with the power transmission shaft 138 and be selectively connected to either the high-speed gear 133 or the low-speed gear 135, is provided on the outer circumference in the middle of the power transmission shaft 138.

The multi-plate clutch 137 comprises a piston 137b hydraulically operated in one direction of a main body 137a and elastically supported by a return spring 137e in the other direction of the main body 137a.

Here, a plurality of clutch plates 137c and a plurality of clutch discs 137d are alternately provided in the direction that the piston 137b is hydraulically operated such that the piston 137b operates to press the clutch plates 137c to the clutch discs 137d, thus enabling power transmission by frictional force.

However, the positions of the high-speed gear 133 and the low-speed gear 135 may be changed to each other with any limitations.

A single-acting flow path 131b for supplying a working fluid to the piston 137b is formed around the power transmission shaft 138.

The actuator 170 supplies the working fluid to the flow path 131b in response to a signal from the control unit 160 to selectively perform the power transmission to the high-speed gear 133 or the low-speed gear 135.

Here, the power transmission shaft 138 rotates at a reduction ratio of the high-speed gear 133 or the low-speed gear 135, which has received the rotational power through the multi-plate clutch 137.

The clutch plates 137c are being elastically supported by the return spring 137e and, when the hydraulic pressure supply is cut off, the clutch plates 137c are returned to their original state and, at the same time, pull back the return spring 137e.

The return spring 137e pulled back is engaged with the high-speed gear 133 located at the opposite side, thus enabling power transmission.

That is, an internal gear 137f is formed on the inner circumference of the piston 137b to be engaged with the outer circumference of the high-speed gear 133, thus enabling power transmission.

The single-acting transmission 130 having the above-described configuration is being connected to the high-speed gear 133 or the low-speed gear 135 until the hydraulic pressure is supplied.

FIG. 3 shows the power transmission between the mission input shaft 131 and the power transmission shaft 138 through the high-speed gear 133.

The forward/reverse differential gear 150 is a device for transmitting the power of the transmission 130 to left and right wheels 151, in which the rotation ratio of one wheel is proportionally controlled based on the constraint conditions of the other wheel. This differential gear 150 serves to facilitate the cornering of the vehicle.

The control unit 160 will now be described below.

If an acceleration means, which is configured to control the vehicle based on a driver's intent, is in an acceleration state, the control unit 160 determines whether the motor is in a high-load state based on the amount of current detected, before increasing the output power of the motor.

Then, if it is determined that the motor is in the high-load state, the control unit 160 determines whether the transmission 130 is at a high-speed stage or low-speed stage. If it is determined that the transmission 130 is at the high-speed stage, the control unit 160 determines whether the running speed of the vehicle is higher than a predetermined reference value and, if the running speed is lower than the reference value, transmits a signal to the actuator 170 to automatically shift the transmission to the low-speed stage.

Here, if the motor is in the high-load state, the control unit 160 determines whether the transmission 130 is at a high-speed stage or low-speed stage. If the transmission 130 is at the low-speed stage, the control unit 160 determines whether the running speed of the vehicle is higher than a predetermined reference value and, if the running speed is higher than the reference value, transmits a signal to the actuator 170 to automatically shift the transmission to the high-speed stage.

The acceleration means may be an accelerator pedal, and the control unit 160 detects an angle of the accelerator pedal and, if it is determined that the angle of the accelerator pedal is in an increasing state, determines that the acceleration means is in an acceleration state.

The control unit 160 may further comprise a vehicle speed sensor for detecting the running speed of the vehicle.

The load of the motor 120 may be measured based on the amount of current flowing in the motor 120.

The measurement of the load of the motor will now be described in detail be low.

In general, when a load exceeding the maximum driving force is applied to the motor 120, the rotational speed of the motor 120 is reduced and falls below its rated range. Then, the driving force of the motor 120 no longer increases, and the current flowing in the motor 120 abruptly increases.

This state can be defined as an overload condition, in which the overload current (locked rotor current, LRC) is 100 to 800% of the maximum output current (full load current, FLC) and; in a severe case, can cause permanent damage to the motor 120.

Therefore, before the overload causes damage to the motor 120, the transmission 130 may be automatically shifted to resolve the overload state.

Here, the time when the current value (LRC) exceeds 40% of the maximum output current (FLC) is preferably set to the speed change time.

Meanwhile, when the driver controls the vehicle through the acceleration means, if the acceleration is not significantly increased during low-speed running, the power applied to the motor is not high. At this time, even if the vehicle is on a gentle slope, it cannot be said that this state is the overload state with respect to the maximum output power of the motor. However, when a low power is applied to the motor at this time, a load exceeding the output power of the motor is applied, and thus the rotational speed of the motor is reduced below the rated rotational speed.

At this time, a power higher than the applied power flows in the motor to increase the output power of the motor such that the vehicle is accelerated, which in turn causes loss of power, and thus the vehicle speed is reduced, which is called a low-load beat phenomenon.

Before such a beat phenomenon occurs, even if the vehicle is running in a low-power state, when the overload state (i.e., a load higher than the applied power) is detected, the transmission 130 may be shifted to resolve the overload state.

This low-load speed change control increases the efficiency of the transmission, and an optimum low-load speed change time in view of the efficiency of the low-load speed change is preferably 2:1 or higher due to the nature of the motor, while it varies according to gear ratios.

Figure 5:
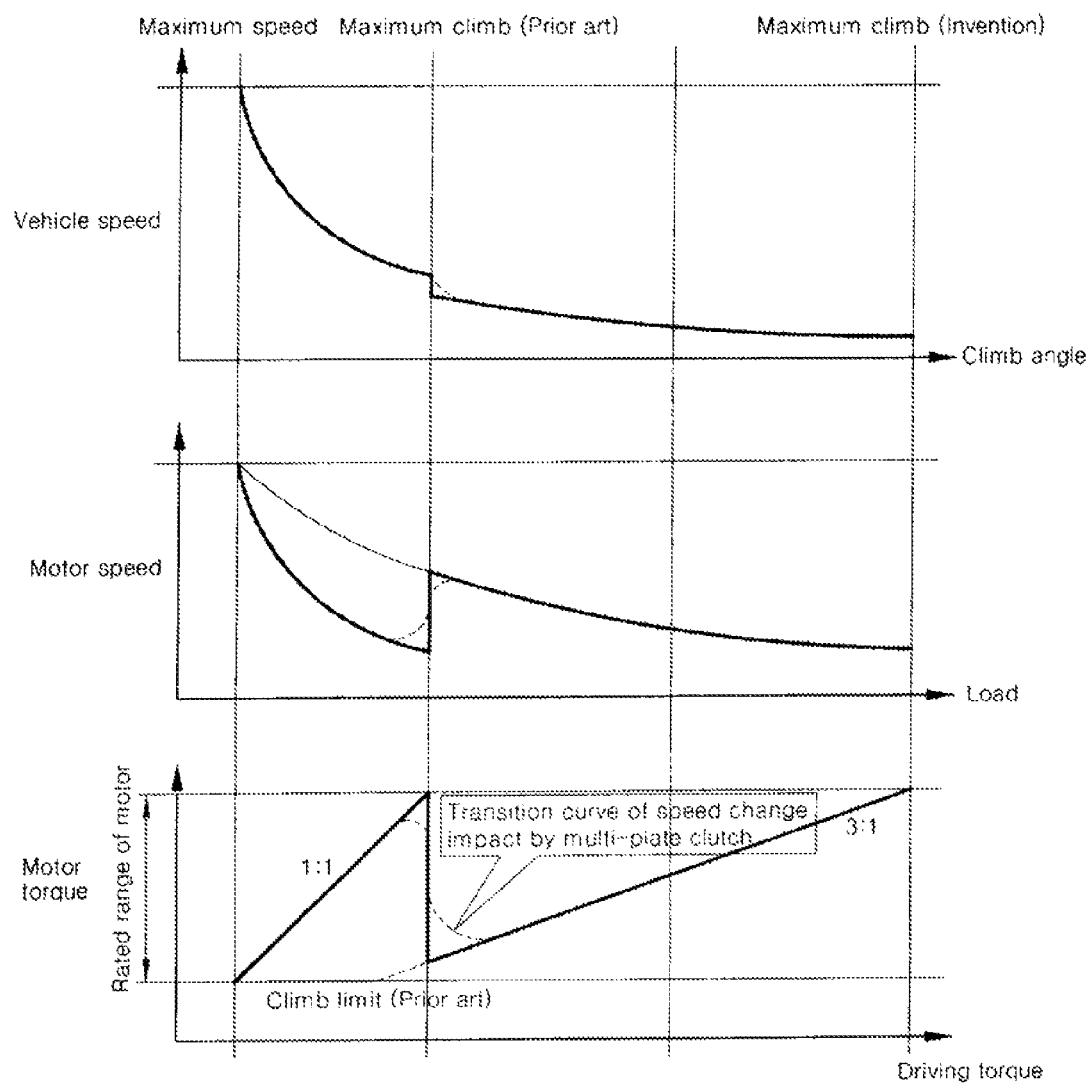
FIG. 5 is graphs illustrating changes in characteristics before and after speed change in the automatic transmission system according to the present invention.
Figure 6:
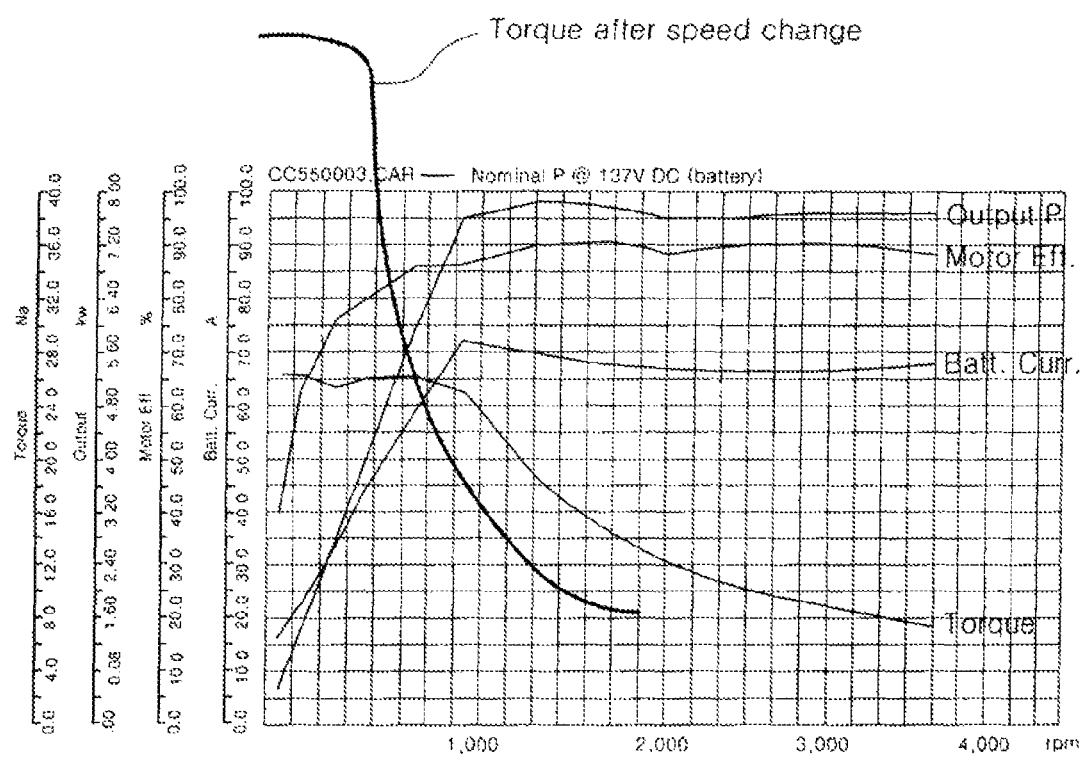
FIG. 6 is a graph illustrating changes in motor torque and power in the automatic transmission system according to the present invention.
Figure 7:
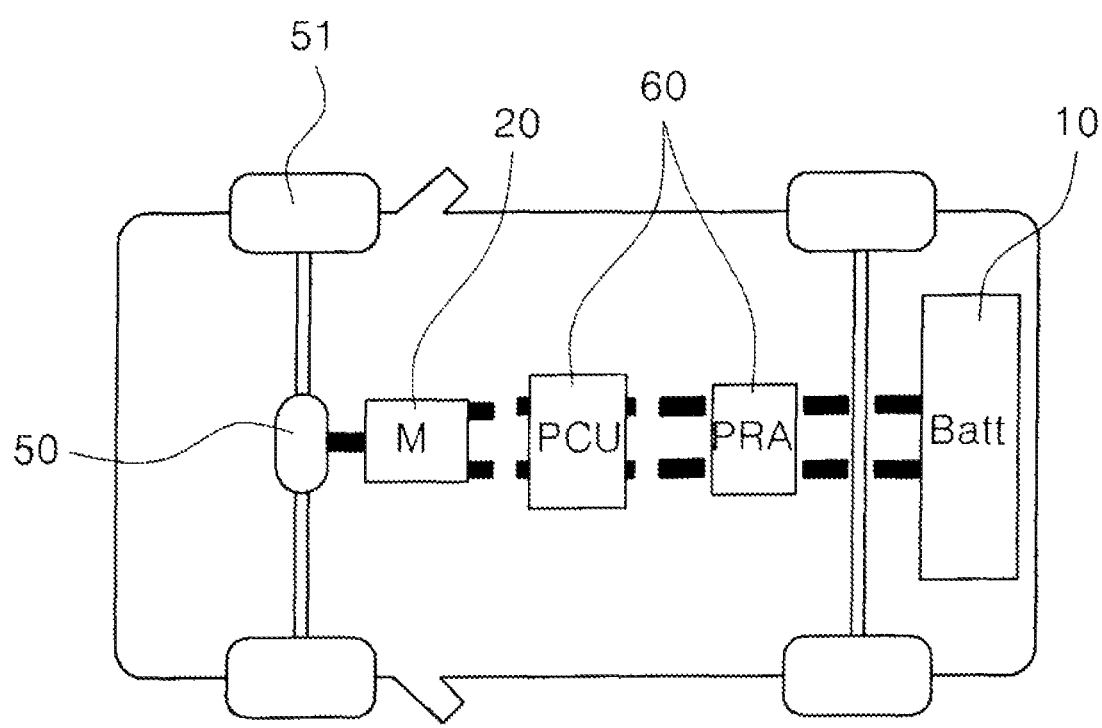
FIG. 7 is a schematic diagram illustrating the structure of a conventional electric vehicle.

According to the present invention, in which the speed change gear ratio is set to 2:1, when the low-load speed change is performed at 40% or higher of the maximum output current (FLC), as shown in FIGS. 5 and 6, it is possible to prevent the output power of the motor from exceeding the rated range after the speed change.

Meanwhile, the actuator 170 is a device for supplying the working fluid compressed by a hydraulic pump, and the supply of the working fluid is cut off in response to a signal from the control unit 160.

A method for controlling the speed change of the present invention will now be described below.

Figure 4:
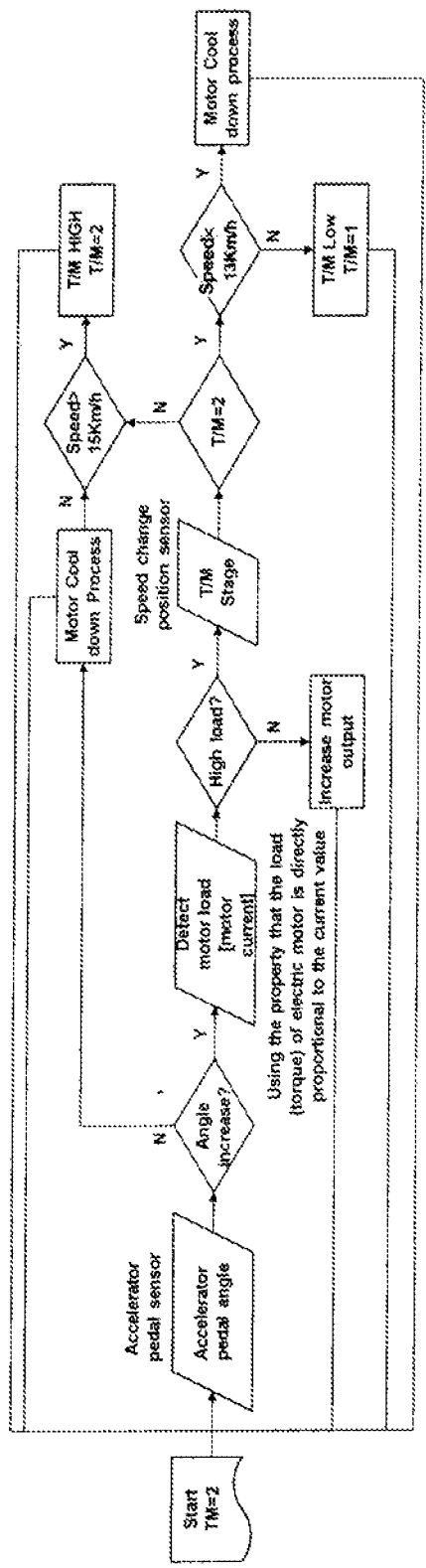
FIG. 4 is a control logic diagram illustrating a load-sensitive automatic transmission system for an agricultural electric vehicle according to the present invention.

FIG. 4 is a control logic diagram illustrating a load-sensitive automatic transmission system for an agricultural electric vehicle according to the present invention.

First, a start step is performed, in which the electric vehicle of the present invention, which employs a two-speed transmission including a high-speed stage and a low-speed stage, starts at a high-speed stage.

Next, a step of determining whether the acceleration means is in an acceleration state is performed. An accelerator pedal may be used as the acceleration means, and the rotational speed of the motor is controlled in response to a variation in the angle of the accelerator pedal, thus controlling the running speed of the vehicle. An increase in the angle of the accelerator pedal can be defined as an increase in the running speed of the vehicle, i.e., the rotational speed of the motor.

Then, when it is determined that the acceleration means is in an acceleration state, a step of determining whether the motor is in a high-load state is performed.

Here, the motor load may be detected by measuring the amount of current flowing in the motor. If an overload current flowing in the motor is detected, that is, if the current flowing in the motor exceeds 40% of the maximum output current (FLC), it is determined that the motor is in the high-load state.

Subsequently, if the motor is in the high-load state, a step of determining whether the transmission is at a high-speed stage or low-speed stage.

Here, if the motor is not in the high-load state, the vehicle is in a normal running state, where the output power of the motor is increased. However, if the motor is in the high-load state, the vehicle is in an abnormal state; and it is determined whether the transmission is at a high-speed stage or low-speed stage.

If a high load is applied to the motor while the transmission is at the low-speed stage, the transmission may be shifted to the high-speed stage or the motor load may be reduced by performing a cooling process on the motor.

Here, the condition for the shift to the high-speed stage or the condition for the cooling process on the motor can be determined by determining whether the running speed of the vehicle is higher than a predetermined reference value. For example, if the running speed is lower than 15 km/h, the cooling process is performed on the motor, whereas, if it is higher than 15 km/h, the transmission is shifted to the high-speed stage.

Next, if a high load is applied to the motor while the transmission is at the high-speed stage, it is determined whether the running speed is higher than a predetermined reference value.

Here, if the reference value is 13 km and the running speed is 13 km, the cooling process is performed on the motor and, if it is determined that the running speed falls below 13 km, the control unit transmits a control signal to the actuator such that the transmission is immediately and automatically shifted to the low-speed stage.

The reason for the difference between the reference value at the high-speed stage and that at the low-speed stage is to provide a speed sharing region within a permissible range of each other and, if there is no difference, to prevent early damage to the transmission due to frequent speed changes at a certain speed.

Here, the running speed can be represented by the following formula:

Motor rotational speed(RPM)×Speed change ratio.

FIG. 5 is graphs illustrating changes in characteristics before and after speed change in the automatic transmission system according to the present invention, and FIG. 6 is a graph illustrating changes in motor torque and power in the automatic transmission system according to the present invention.

Referring to the graph of FIG. 5, the change in vehicle speed, the change in motor speed, and the change in motor torque are shown from the top.

Here, the left region with respect to the boundary line of the maximum climb of the prior art corresponds to the region before the speed change, and the right region corresponds to the region after the speed change.

In the region before the speed change, if a load exceeding the maximum driving force of the motor is applied, such as hill climbing, the rotational speed (rpm) of the motor and the vehicle speed sharply decrease. Then, when the driving force reaches its maximum climb limit, which exceeds the rated range of the motor, the driving force of the motor no longer increases, and an overload current flowing in the motor suddenly increases.

The automatic transmission system of the present invention dc fines this situation as the speed change time and automatically shifts the transmission at a predetermined reduction ratio through the actuator.

Referring to the graph showing the change directly after the speed change, it can be seen that the sharply reduced vehicle speed is maintained at a constant level. Moreover, it can be seen that the rotational speed (rpm) of the motor temporarily increases and then gently declines as the climb angle increases.

Moreover, referring to the change in motor torque, it can be seen that the motor torque falls to the bottom of the rated range of the motor immediately after the speed change and then continuously increases as the climb angle increases.

According to the present invention, the reduction ratio of the transmission may be set to 2:1 or 3:1 and, in this case, it is possible to obtain a driving torque two to three times higher than that of the existing motor.

As shown in FIGS. 5 and 6, according to the present invention, it is preferred that the low-load speed change be performed at 40% or higher of the maximum output current (FLC).

As described above, the present invention provides the following effects.

It is possible to selectively provide high speed and high torque to meet the needs of different situation, beyond the limitations of the motor drive performance of the conventional electric vehicle. The hill climbing performance of the vehicle is improved due to the high torque, and thus the utilization of the vehicle as an agricultural working vehicle is high. Moreover, the motor can be manufactured to a small size, and thus the manufacturing cost can be reduced.

Furthermore, the use of the forward/reverse gear and the clutch mechanism employed in a typical electric vehicle is not required, and thus it is possible to simplify the structure of the vehicle and reduce the weight of the vehicle. In addition, the load of the motor is automatically detected during hill climbing to automatically shift the transmission, and thus it is possible to prevent a transmission shock or any unexpected accidents due to backward rolling of the vehicle caused by manual transmission operation on a slope.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A load-sensitive automatic transmission system for an agricultural electric vehicle, the automatic transmission system comprising:
   a drive motor for generating a rotational power using electric power of a battery;
   a transmission for changing a rotational speed of the drive motor in multiple stages and outputting the changed rotational speed;
   a forward/reverse differential gear for transmitting the power of the transmission to wheels;
   a control unit for detecting a running state of the vehicle and a load state of the drive motor and determining a speed change time; and
   an actuator for operating the transmission in response to a signal from the control unit.

2. The automatic transmission system of claim 1, wherein the control unit comprises a vehicle speed sensor for detecting a running speed of the vehicle.

3. The automatic transmission system of claim 1, wherein the transmission and the forward/reverse differential gear are integrally formed with each other.

4. The automatic transmission system of claim 1, wherein the actuator is an electronic clutch.

5. The automatic transmission system of claim 1, wherein the actuator is a hydraulic system.

6. The automatic transmission system of claim 5, wherein the transmission is classified into a double-acting transmission including a plurality of hydraulic lines and a single-acting transmission including a single hydraulic line according to a control method of the hydraulic system, and any one of the two types of transmissions is selectively used.

7. The automatic transmission system of claim 6, wherein the double-action transmission comprises a mission input shaft connected to a shaft of the motor to receive the rotational force of the motor, a power transmission shaft transmitting the power of the mission input shaft to an axle and arranged in parallel to the mission input shaft, and a high-speed gear and a low-speed gear spaced from each other in the axial direction, provided on the mission input shaft and the power transmission shaft, respectively, and engaged with the mission input shaft and the power transmission shaft to transmit power, and
   wherein the high-speed gear and the low-speed gear provided on the mission input shaft are axially connected thereto so as to operate in an idle state, and a multi-plate clutch, which is configured to rotate together with the mission input shaft and be selectively connected to either the high-speed gear or the low-speed gear, is provided on the outer circumference in the middle of the mission input shaft.

8. The automatic transmission system of claim 7, further comprising a double-acting flow path for supplying a working fluid to pistons on both sides of the mission input shaft, respectively, the double-acting flow path being provided in the middle of the mission input shaft.

9. The automatic transmission system of claim 6, wherein the single-acting transmission comprises a mission input shaft connected to a shaft of the motor to receive the rotational force of the motor, a power transmission shaft transmitting the power of the mission input shaft to an axle and arranged in parallel to the mission input shaft, and a high-speed gear and a low-speed gear spaced from each other in the axial direction, provided on the mission input shaft and the power transmission shaft, respectively, and engaged with the mission input shaft and the power transmission shaft to transmit power, and wherein the high-speed gear and the low-speed gear provided on the power transmission shaft are axially connected thereto so as to operate in an idle state, and a multi-plate clutch, which is configured to rotate together with the power transmission shaft and be selectively connected to either the high-speed gear or the low-speed gear, is provided on the outer circumference in the middle of the power transmission shaft.

10. The automatic transmission system of claim 9, wherein the multi-plate clutch comprises a piston hydraulically operated in one direction of a main body and elastically supported by a return spring in the other direction of the main body, a plurality of clutch plates and a plurality of clutch discs, which are alternately provided in the direction that the piston is hydraulically operated such that the piston operates to press the clutch plates to the clutch discs, thus enabling power transmission by frictional force.

11. The automatic transmission system of claim 9, further comprising a single-acting flow path for supplying a working fluid to the piston, the single-acting flow path being formed around the power transmission shaft.

12. The automatic transmission system of claim 10, further comprising an internal gear formed on the inner circumference of the piston to be engaged with the outer circumference of the high-speed gear such that the internal gear is engaged with the high-speed gear when the piston is pulled back by the return spring, thus enabling power transmission.

13. A load-sensitive automatic transmission system for an agricultural electric vehicle, the automatic transmission system being, configured to determine whether a motor is in a high-load state based on the amount of current detected, before increasing the output power of the motor, if an acceleration means, which is configured to control the vehicle based on a driver's intent, is in an acceleration state, to determine whether a transmission is at a high-speed stage or low-speed stage if the motor is in the high-load state, to determine whether a running speed of the vehicle is higher than a predetermined reference value if the transmission is at the high-speed stage, and to transmit a signal to an actuator to automatically shift the transmission to the low-speed stage if the running speed is lower than the reference value.

14. The automatic transmission system of claim 13, wherein the acceleration means is an accelerator pedal such that an angle of the accelerator pedal is detected and, if the angle of the accelerator pedal is in an increasing state, it is determined that the acceleration means is in an acceleration state.

15. The automatic transmission system of claim 13, wherein the load of the motor is measured based on the amount of current flowing in the motor and, if the current value exceeds a predetermined reference value, it is determined that the motor is in the high-load state, thus performing the speed change.

16. The automatic transmission system of claim 15, wherein the reference value exceeds 40% of a maximum output current.

17. The automatic transmission system of claim 13, wherein the actuator is an electronic clutch.

18. The automatic transmission system of claim 13, wherein the actuator is a hydraulic system.

19. A method for controlling a load-sensitive automatic transmission system for an agricultural electric vehicle, the method comprising the steps of:

starting the vehicle;

determining whether an acceleration means is in an acceleration state;

determining whether a motor is in a high-load state if the acceleration means is in the acceleration state;

determining whether a transmission is at a high-speed stage or low-speed stage if the motor is in the high-load state;

determining whether a running speed of the vehicle is higher than a predetermined reference value if the transmission is at the high-speed stage; and automatically shifting the transmission to the low-speed stage if the running speed is lower than the reference value.

20. The method of claim 19, further comprising the step of automatically shifting the transmission to the high-speed stage if the running speed is higher than the reference value while the transmission is at the low-speed stage and the step of performing a cooling process on the motor if the running speed is lower than the reference value.

21. The method of claim 19, further comprising the step of performing a cooling process on the motor if the running speed is higher than the reference value while the transmission is at the high-speed stage.

22. The method of claim 19, wherein the running speed is represented by the following formula:

Motor rotational speed(RPM)×Speed change ratio.

* * * * *